(12) United States Patent
Ando

(10) Patent No.: US 9,088,968 B2
(45) Date of Patent: *Jul. 21, 2015

(54) WIRELESS COMMUNICATION DEVICE

(71) Applicant: BROTHER KOGYO KABUSHIKI KAISHA, Nagoya (JP)

(72) Inventor: Satoko Ando, Chita (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 171 days.

This patent is subject to a terminal disclaimer.

(21) Appl. No.: 13/846,511

(22) Filed: Mar. 18, 2013

(65) Prior Publication Data

US 2013/0303083 A1 Nov. 14, 2013

(30) Foreign Application Priority Data

May 9, 2012 (JP) ................................. 2012-107585

(51) Int. Cl.
 *H04B 5/00* (2006.01)
 *H04N 1/00* (2006.01)
 *H04W 76/02* (2009.01)

(52) U.S. Cl.
 CPC .................................. *H04W 76/021* (2013.01)

(58) Field of Classification Search
 USPC ........... 455/41.1, 41.2, 552.1, 553.1; 370/338
 See application file for complete search history.

(56) References Cited

U.S. PATENT DOCUMENTS 8,089,982 B1 * 1/2012 Vleugels et al. ............. 370/447
8,560,012 B2 * 10/2013 Ohnishi et al. ............. 455/556.1

2007/0204049 A1 8/2007 Herrod
2008/0090520 A1 * 4/2008 Camp et al. ................... 455/41.2
2009/0180451 A1 * 7/2009 Alpert et al. .................. 370/338
2011/0177780 A1 7/2011 Sato et al.
2011/0237241 A1 9/2011 Nagasaki (Continued)

FOREIGN PATENT DOCUMENTS

JP 2007166538 A 6/2007
JP 2011146991 A 7/2011

(Continued)

OTHER PUBLICATIONS

Wi-Fi Peer-to-Peer (P2P) Technincal Specification Version 1.1, Copyright 2010 Wi-Fi Alliance (159 pages).

(Continued)

*Primary Examiner* — Quochien B Vuong
(74) *Attorney, Agent, or Firm* — Merchant & Gould PC

(57) ABSTRACT

A wireless communication device may execute a wireless communication with a specific device by using first or second setting information. The wireless communication device may determine whether the wireless communication device is capable of executing the wireless communication using the second setting information with the specific device. The wireless communication device may change target setting information that is setting information currently to be used from the second setting information to the first setting information in a case where a network identifier is received from the specific device in a situation in which it is determined that the wireless communication device is not capable of executing the wireless communication using the second setting information, and maintain the second setting information as the target setting information in a case where the network identifier is not received from the specific device in the above situation.

9 Claims, 9 Drawing Sheets

(56) References Cited

U.S. PATENT DOCUMENTS

| | | |
|---|---|---|
| 2011/0320611 A1 | 12/2011 | Inada et al. |
| 2012/0019674 A1 | 1/2012 | Ohnishi et al. |
| 2012/0069772 A1 | 3/2012 | Byrne et al. |
| 2013/0260682 A1* | 10/2013 | Suzuki et al. ............... 455/41.1 |
| 2013/0260683 A1 | 10/2013 | Suzuki et al. |
| 2013/0260818 A1 | 10/2013 | Suzuki et al. |
| 2013/0260819 A1* | 10/2013 | Suzuki et al. ............. 455/552.1 |

FOREIGN PATENT DOCUMENTS

| | | |
|---|---|---|
| JP | 2011-205581 A | 10/2011 |
| JP | 2012-010080 A | 1/2012 |

OTHER PUBLICATIONS

U.S. Office Action mailed on Nov. 21, 2014, issued in co-pending U.S. Appl. No. 13/832,035 (16 pages).

U.S. Office Action mailed on Nov. 21, 2014, issued in co-pending U.S. Appl. No. 13/831,983 (13 pages).

U.S. Office Action issued in related U.S. Appl. No. 13/831,969, mailed on Mar. 17, 2015.

* cited by examiner

Second Case : Case That Telephone Device is not Reset

Third Case : Case That Telephone Device Enters State in which Wireless Communication is Impossible State Fourth Case : Case That AP is Changed (Continued from Fig. 8)

WIRELESS COMMUNICATION DEVICE

CROSS-REFERENCE TO RELATED APPLICATION

This application claims priority to Japanese Patent Application No. 2012-107585, filed on May 9, 2012, the contents of which are hereby incorporated by reference into the present application.

TECHNICAL FIELD

The present specification teaches a wireless communication device for executing a wireless communication with a specific device.

DESCRIPTION OF RELATED ART

A technique is known for an MFP (abbreviation of: Multi-function Peripheral) and a telephone device to execute a wireless communication via an access point (called "AP" below (abbreviation of Access Point)) by using second wireless setting information. In this technique, the MFP sends the second wireless setting information, by using first wireless setting information which is different from the second wireless setting information, to the telephone device by means of executing a wireless communication not via the AP. The telephone device changes the first wireless setting information, which is currently set in the telephone device, to the second wireless setting information received from the MFP. When the first wireless setting information is changed to the second wireless setting information, the telephone device sends a connection completion notification to the MFP. Upon receiving the connection completion notification from the telephone device, the MFP changes the first wireless setting information of the MFP to the second wireless setting information. Thereby, the MFP and the telephone device can execute the wireless communication via the AP by using the second wireless setting information.

SUMMARY

In the present specification, a technique is taught whereby a wireless communication device can execute a wireless communication by using appropriate setting information.

The specification discloses a wireless communication device for executing a wireless communication with a specific device. The wireless communication device may comprise an information memory that stores first setting information including a first network identifier, one or more processors and an instruction memory that stores computer-readable instructions therein. The computer-readable instructions, when executed by the one or more processors, may cause the wireless communication device to execute executing a wireless communication with the specific device by using the first setting information or second setting information that is different from the first setting information; determining whether or not the wireless communication device is capable of executing the wireless communication using the second setting information with the specific device, in a case where target setting information that is setting information currently to be used by the wireless communication device is the second setting information; changing the target setting information from the second setting information to the first setting information in a case where the first network identifier is received from the specific device in a situation in which it is determined that the wireless communication device is not capable of executing the wireless communication using the second setting information with the specific device; and maintaining the second setting information as the target setting information in a case where the first network identifier is not received from the specific device in the situation in which it is determined that the wireless communication device is not capable of executing the wireless communication using the second setting information with the specific device.

Moreover, a control method, a computer program, and a non-transitory computer-readable storage medium storing computer-readable instructions for the wireless communication device, are also novel and useful. Further, a wireless communication system including the wireless communication device and the specific device are also novel and useful.

DETAILED DESCRIPTION (Configuration of System)

Figure 1:
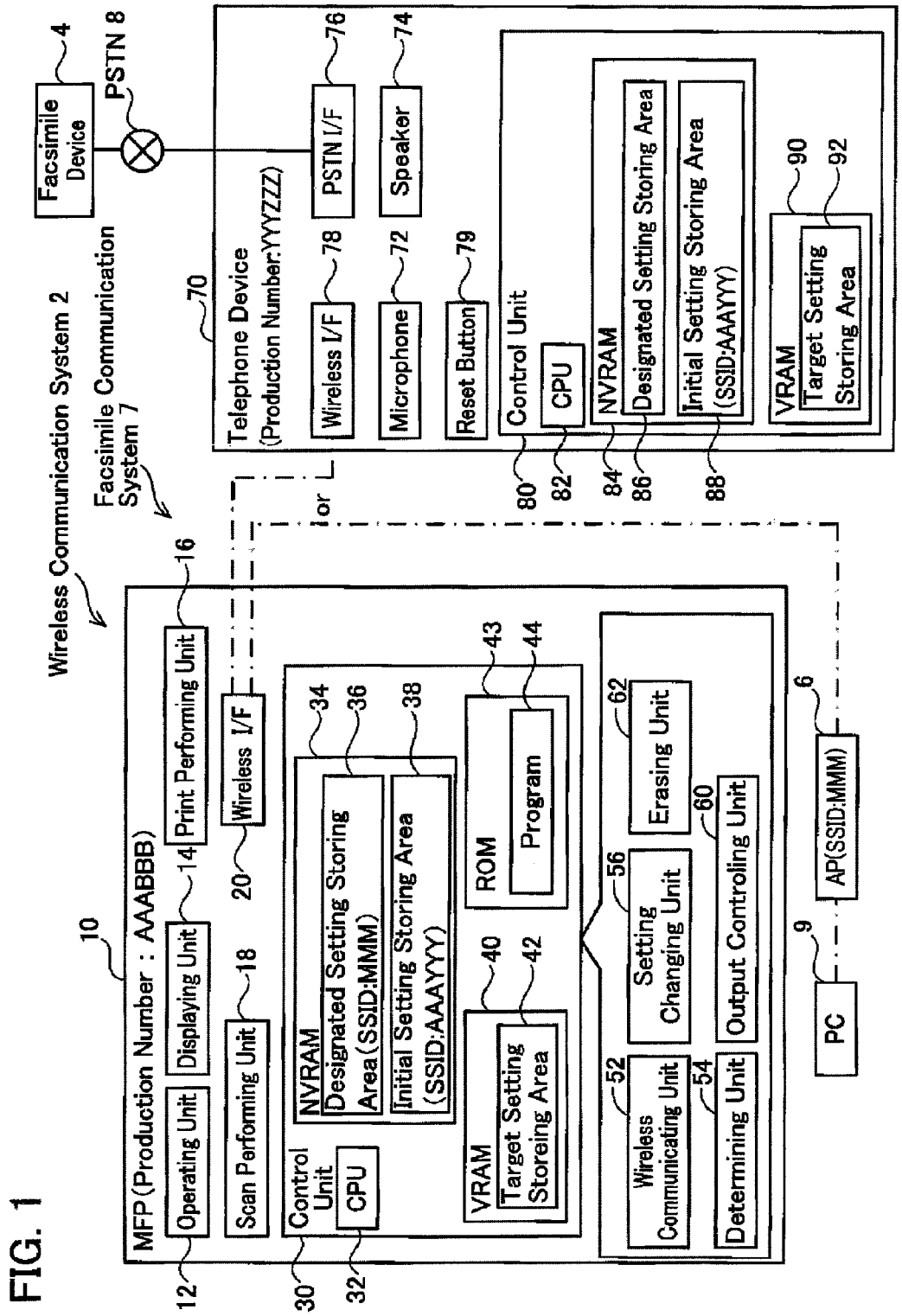
FIG. 1 shows the configuration of a wireless communication system.

As shown in FIG. 1, a wireless communication system 2 comprises an AP 6, a PC 9, a facsimile communication system 7, and a facsimile device 4. The facsimile communication system 7 comprises an MFP 10 and a telephone device 70. The MFP 10 and the telephone device 70 are capable of executing a wireless communication with one another via the AP 6 or not via the AP 6. That is, the MFP 10 and the telephone device 70 are capable of an infrastructural wireless communication via the AP 6, or an adhoc wireless communication not via the AP 6. Moreover, in the present embodiment, the wireless communication is executed based on standard 802.11 of the IEEE (The Institute of Electrical and Electronics Engineers, Inc.), and standards based thereon (e.g., 802.11a, 11b, etc.). Consequently, setting information WS1, WS2, WS3 (to be described) is setting information conforming to the above standards. Moreover, the telephone device 70 is capable of executing a communication of facsimile data with the facsimile device 4 via a PSTN (Public Switched Telephone Network) 8, which is a general public telephone network. Further, the MFP 10 is capable of executing a wireless communication with the PC 9 via the AP 6.

(Configuration of MFP 10)

The MFP 10 (may be called "parent device") comprises an operating unit 12, a displaying unit 14, a print performing unit 16, a scan performing unit 18, a wireless interface 20, and a control unit 30. The operating unit 12 comprises a plurality of keys. The user can input various instructions to the MFP 10 by operating the operating unit 12. The displaying unit 14 is a display for displaying various types of information. The print performing unit 16 is an ink jet system or laser system, etc. printing mechanism. The scan performing unit 18 is a CCD, CIS, etc. scan mechanism. The wireless interface 20 is an interface for executing a wireless communication.

The control unit 30 comprises a CPU 32, an NVRAM (nonvolatile memory) 34, a VRAM (volatile memory) 40, and a ROM 43. The CPU 32 executes various processes according to a program 44 stored in the ROM 43. Functions of units 52 to 62 are realized by the CPU 32 executing a process according to the program 44.

The NVRAM 34 comprises a designated setting storing area 36 and an initial setting storing area 38. The initial setting storing area 38 is a storage area for storing setting information predetermined by a manufacturer or a vendor of the MFP 10 (i.e., default authentication scheme, default encryption scheme, default password, etc.). Below, the setting information stored in the initial setting storing area is called "initial setting WS1". The initial setting WS1 has been stored in advance in the MFP 10 at the stage of shipping the MFP 10. The initial setting WS1 is adhoc wireless setting information for realizing a wireless communication not via the access point 6.

The initial setting WS1 includes an SSID (abbreviation of Service Set Identifier) (called "SSID of WS1" below), which is a network identifier for identifying a network (i.e., an adhoc network) for executing a wireless communication by using the initial setting WS1. The SSID of WS1 is generated by the manufacturer or the vendor of the MFP 10. The SSID "AAAYYY" of WS1 is generated using "AAA", which is a part of a production number (i.e., AAABBB) of the MFP 10, and "YYY", which is a part of a production number (i.e., YYYZZZ) of the telephone device 70.

In a case of wanting the MFP 10 to execute a wireless communication by using setting information different from the initial setting WS1, the user can, e.g., operate the operating unit 12 of the MFP 10 to designate the setting information (i.e., authentication scheme, encryption scheme, password, etc.) that the MFP 10 is to use. Below, the setting information of the MFP 10 designated by the user is called "designated setting WS". The designated setting storing area 36 is a storage area for storing the designated setting WS. Moreover, in the present embodiment, the designated setting WS is infrastructural wireless setting information for realizing a wireless communication via the access point 6. Consequently, the designated setting WS is different from the initial setting WS1, which is adhoc wireless setting information.

The VRAM 40 comprises a target setting storing area 42. The target setting storing area 42 is a storage area for storing setting information to be currently used when the MFP 10 executes a wireless communication. Throughout the period from the MFP 10 being shipped until the designated setting WS being designated by the user, the CPU 32 reads the initial setting WS1 from the initial setting storing area 38 when the power of the MFP 10 is turned ON, and stores the initial setting WS1 in the target setting storing area 42. Thereby, the MFP 10 can execute a wireless communication by using the adhoc wireless setting information. After the designated setting WS has been designated by the user, the CPU 32 usually stores the designated setting WS in the target setting storing area 42 when the power of the MFP 10 is turned ON. Thereby, the MFP 10 can execute a wireless communication by using the infrastructural wireless setting information.

That is, the MFP 10 executes a wireless communication in either mode of the two types of mode, namely, infrastructure mode and adhoc mode. In a case where the initial setting WS1 is being stored in the target setting storing area 42, the MFP 10 executes the wireless communication in the adhoc mode, and in a case where the designated setting WS is being stored in the target setting storing area 42, the MFP 10 executes the wireless communication in the infrastructure mode.

(Configuration of Telephone Device 70)

The telephone device (may be called a "child device") 70 comprises a microphone 72, a speaker 74, a PSTN interface 76, a wireless interface 78, a control unit 80, and a reset button 79. Since the telephone device 70 comprises the microphone 72 and the speaker 74, the user can execute a telephone communication via the PSTN 8 by using the telephone device 70. The PSTN interface 76 is connected to the PSTN 8. Specifically, one end of a PSTN cable is connected to the PSTN interface 76. The other end of the PSTN cable is connected to, e.g., a PSTN socket within a home. The wireless interface 78 is an interface for executing a wireless communication.

The control unit 80 comprises a CPU 82, an NVRAM 84, and a VRAM 90. The CPU 82 executes various processes according to a program stored in a ROM (not shown) of the telephone device 70.

The NVRAM 84 comprises a designated setting storing area 86 and an initial setting storing area 88. The initial setting storing area 88 is a storage area for storing the adhoc initial setting WS1, which is the same as that of the MFP 10. The initial setting WS1 has been stored in advance in the telephone device 70 at the stage of shipping the telephone device 70 (i.e., the stage of shipping the MFP 10).

In a case of wanting the telephone device 70 to execute a wireless communication with the MFP 10 by using setting information different from the initial setting WS1, the user can, e.g., operate the operating unit 12 of the MFP 10 to designate setting information (i.e., authentication scheme, encryption scheme, password, etc.) (i.e., the designated setting WS) that the telephone device 70 is to use. When the designated setting WS is designated by the user, the MFP 10 wirelessly sends the designated setting WS to the telephone device 70 by using the setting information that is currently to be used by the MFP 10 (e.g., the initial setting WS1). Thereby, the telephone device 70 can acquire the designated setting WS.

The designated setting storing area 86 is a storage area for storing the designated setting WS. Moreover, in the present embodiment, the designated setting WS is infrastructural wireless setting information. Consequently, the designated setting WS is different from the adhoc initial setting WS1.

The VRAM 90 comprises a target setting storing area 92. The target setting storing area 92 is a storage area for storing wireless setting information that is currently to be used by the telephone device 70. Throughout the period from the telephone device 70 being shipped with the MFP 10 until the designated setting WS being designated by the user, the control unit 80 stores the initial setting WS1 in the target setting storing area 92 when the power of the telephone device 70 is turned ON. Thereby, the telephone device 70 can execute a wireless communication by using the adhoc wireless setting information. After the designated setting WS has been designated by the user, the control unit 80 usually stores the designated setting WS in the target setting storing area 92 when the power of the telephone device 70 is turned ON. Thereby, the telephone device 70 can execute a wireless communication by using the infrastructural wireless setting information. The MFP 10 and the telephone device 70 are each set with the initial setting WS1 as its wireless setting at the stage of shipping, thereby reaching a state of being capable of mutual communication.

That is, similar to the MFP 10, the telephone device 70 executes a wireless communication in either mode of the two types of mode, namely the infrastructure mode and the adhoc mode. In a case where the initial setting WS1 is being stored in the target setting storing area 92, the telephone device 70 executes the wireless communication in the adhoc mode. In a case where a designated setting WS3 is being stored in the target setting storing area 92, the telephone device 70 executes the wireless communication in the infrastructure mode.

The reset button 79 is a button for resetting the setting information stored in the NVRAM 84 back to the setting information of the shipping stage. When the reset button 79 is operated by the user, the control unit 80 erases the designated setting WS stored in the designated setting storing area 86 and, in a case where the setting information being stored in the target setting storing area 92 is not the initial setting WS1, changes the setting information being stored in the target setting storing area 92 to the initial setting WS1. That is, when the reset button 79 is operated by the user, the telephone device 70 is set to the adhoc mode.

The MFP 10 realizes a specific function (e.g., facsimile function), from among a plurality of functions (e.g., facsimile function, print function) that the MFP 10 is capable of realizing, by executing a process in collaboration with the telephone device 70. Consequently, the telephone device 70 is not usually shipped alone, but is shipped together with the MFP 10. That is, the telephone device 70 is an accessory device of the MFP 10.

(Facsimile Function)

For example, in a case of receiving facsimile data via the PSTN interface 76, the telephone device 70 sends the facsimile data to the MFP 10 by executing a wireless communication. In a case where the MFP 10 executes a wireless communication to receive the facsimile data sent from the telephone device 70 using the wireless interface 20, the MFP 10 causes the print performing unit 16 to execute a print of an image represented by the facsimile data. Thereby, a facsimile receiving operation is executed.

Further, the MFP 10 sends facsimile data, generated by the scan performing unit 18 scanning a document, to the telephone device 70 by executing a wireless communication. In a case of receiving, by using the wireless interface 78, the facsimile data sent from the MFP 10, the telephone device 70 sends the facsimile data via the PSTN 8 to a destination designated in advance by the user. Thereby, a facsimile sending operation is executed.

Moreover, the MFP 10 comprises the print performing unit 16 for printing an image represented by the facsimile data received via the PSTN 8, whereas the telephone device 70 does not comprise the print performing unit 16. Further, the MFP 10 comprises the scan performing unit 18 for scanning a document and generating facsimile data to be sent via the PSTN 8, whereas the telephone device 70 does not comprise the scan performing unit 18. That is, the telephone device 70 is capable of receiving facsimile data via the PSTN 8 on behalf of the MFP 10, and is capable of sending facsimile data via the PSTN 8 on behalf of the MFP 10.

As described above, the telephone device 70 does not comprise the print performing unit 16 and the scan performing unit 18. Consequently, the telephone device 70 has a smaller size than the MFP 10. Usually, the location of a PSTN socket in a home is determined. If a configuration is adopted in which a PSTN cable needs to be connected to the MFP 10, the MFP 10 needs to be disposed in the vicinity of the PSTN socket. Since the MFP 10 has a comparatively large size, it is difficult to dispose the MFP 10 in the vicinity of the PSTN socket in an environment where the vicinity of the PSTN socket has little space. By contrast, in the present embodiment, the PSTN interface 76 is provided on the telephone device 70 that has a comparatively small size. Consequently, even in an environment having little space in the vicinity of the PSTN socket, the telephone device 70 can easily be disposed in the vicinity of the PSTN socket, and the telephone device 70 can be connected to the PSTN 8. Further, the location of the MFP 10 need not be restricted only to the vicinity of the PSTN socket.

(Basic Processes Executed by MFP and Telephone Device)

Figure 2:
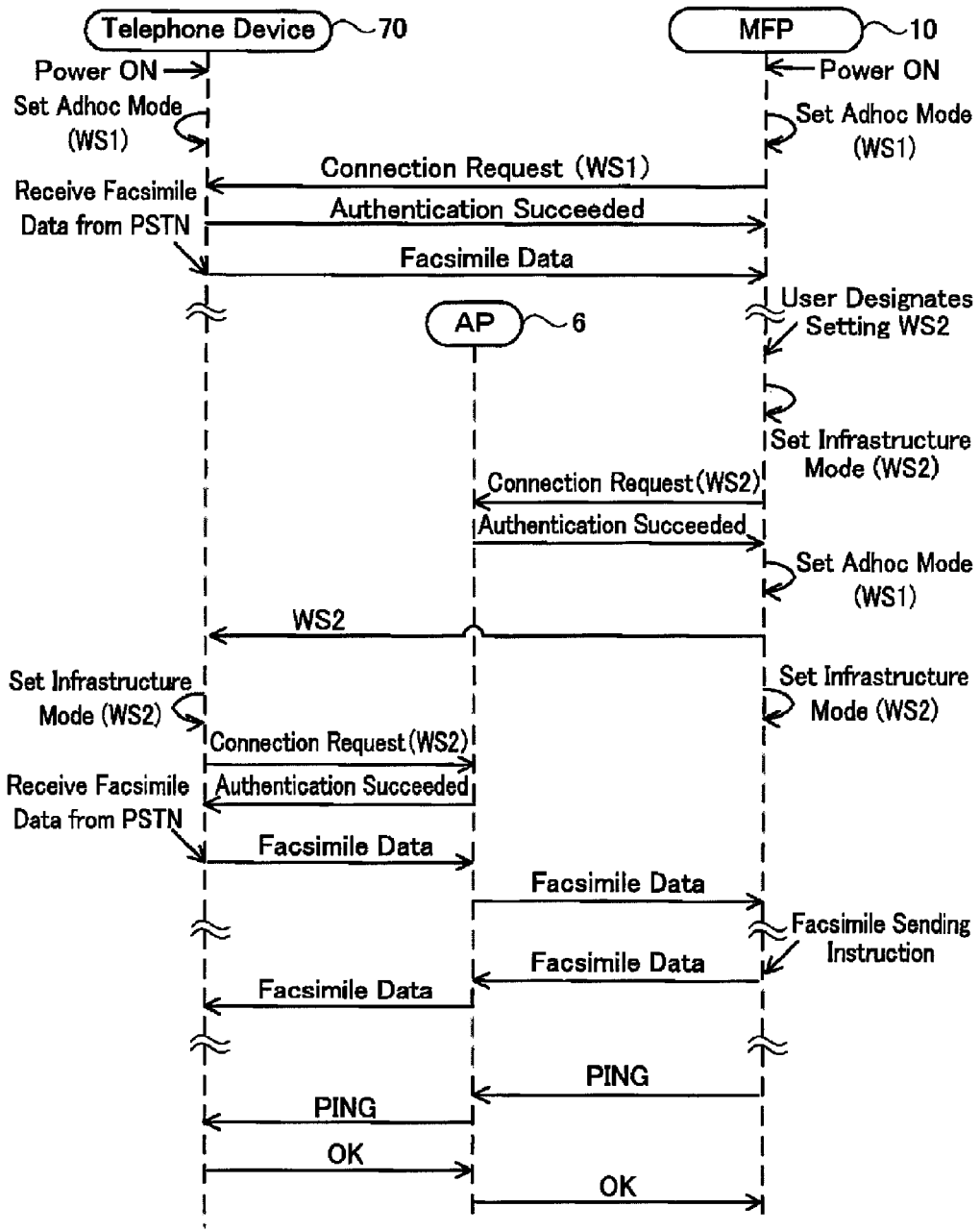
FIG. 2 shows a sequence view of basic processes executed by an MFP and a telephone device.

Next, basic processes for the MFP 10 and the telephone device 70 to execute an infrastructural wireless communication via the AP 6 will be described with reference to FIG. 2. Upon buying the MFP 10 and the telephone device 70, the user disposes the MFP 10 and the telephone device 70 in, e.g., a home. When the user turns ON the power of the MFP 10, the MFP 10 is set to the adhoc mode. Specifically, the control unit 30 stores the initial setting WS1, which is being stored in the initial setting storing area 38, in the target setting storing area 42. Similarly, when the user turns ON the power of the telephone device 70, the telephone device 70 is set to the adhoc mode. Specifically, the control unit 80 of the telephone device 70 stores the initial setting WS1, which is being stored in the initial setting storing area 88, in the target setting storing area 92. Next, in order to execute an adhoc wireless communication with the telephone device 70, a wireless communicating unit 52 executes a connection establish process with the telephone device 70 by using the initial setting WS1.

Specifically, the wireless communicating unit 52 sends, to the telephone device 70, a connection request that includes the initial setting WS1 which is being stored in the target setting storing area 42. Upon receiving the connection request from the MFP 10, the control unit 80 of the telephone device 70 executes authentication based on the connection request. This authentication includes a determination related to whether an authentication scheme and encryption scheme included in the connection request are the same as an authentication scheme and encryption scheme included in the initial setting WS1 that is being stored in the target setting storing area 92. Moreover, since the initial setting WS1 has been stored in advance in both the MFP 10 and the telephone device 70, this authentication usually succeeds. The telephone device 70 sends, to the MFP 10, an authentication result indicating that authentication succeeded. The connection establish process includes sending the connection request, authentication, and sending the authentication result. The wireless communicating unit 52 monitors whether an authentication result is received from the telephone device 70. Upon receiving the authentication result from the telephone device 70, the MFP 10 and the telephone device 70 become capable of executing an adhoc wireless communication.

In this situation, in a case where facsimile data was received from an external device (e.g., the facsimile device 4) via the PSTN 8, the control unit 80 of the telephone device 70 executes an adhoc wireless communication to send the facsimile data to the MFP 10. When a facsimile sending instruction is executed by the user operating the operating unit 12, the control unit 30 of the MFP 10 reads a document set on the scan performing unit 18, and generates the facsimile data. Next, by executing the adhoc wireless communication (i.e., by using the initial setting WS1), the generated facsimile data is sent to the telephone device 70. The control unit 80 of the telephone device 70 sends the facsimile data to a specific device (e.g., the facsimile device 4) via the PSTN 8.

Next, when the designated setting WS2 is designated by the user, the MFP 10 executes a process for executing an infrastructural wireless communication with the telephone device 70 via the AP 6. That is, the wireless communicating unit 52 switches the MFP 10 from the adhoc mode to the infrastructure mode. Specifically, when the designated setting WS2 is stored in the designated setting storing area 36, the wireless communicating unit 52 erases the initial setting WS1 which is being stored in the target setting storing area 42, and stores the designated setting WS2 in the target setting storing area 42. Next, using the designated setting WS2, the wireless communicating unit 52 executes a connection establish process with the AP 6 in order to execute a wireless communication with the AP 6. That is, the wireless communicating unit 52 sends, to the AP 6, a connection request that includes the designated setting WS2. Upon receiving the connection request, the AP 6 executes authentication based on the connection request. This authentication includes, e.g., authentication related to whether an authentication scheme and encryption scheme included in the designated setting WS2 is supported by the AP 6, authentication related to whether a password included in the designated setting WS2 is registered in the AP 6, etc. The AP 6 sends the authentication result to the MFP 10.

The wireless communicating unit 52 monitors whether the authentication result is received from the AP 6. Upon receiving the authentication result indicating that authentication succeeded from the AP 6, the MFP 10 and the AP 6 reach a state where a wireless connection has been established, and become capable of executing the wireless communication. Next, the wireless communicating unit 52 switches the MFP 10 from the infrastructure mode to the adhoc mode. Specifically, the wireless communicating unit 52 erases the designated setting WS2 which is being stored in the target setting storing area 42, and stores the initial setting WS1 in the target setting storing area 42.

Next, the wireless communicating unit 52 executes an adhoc wireless communication by using the initial setting WS1, and sends the designated setting WS2 which is being stored in the designated setting storing area 36 to the telephone device 70.

Upon receiving the designated setting WS2 from the MFP 10, the control unit 80 stores the received designated setting WS2 in the designated setting storing area 86. Next, the control unit 80 erases the initial setting WS1 from the target setting storing area 92, and stores the designated setting WS2 in the target setting storing area 92. Thereby, the telephone device 70 is switched from the adhoc mode to the infrastructure mode. Next, using the designated setting WS2, the control unit 80 executes a connection establish process with the AP 6. That is, the control unit 80 sends, to the AP 6, a connection request that includes the designated setting WS2. Upon receiving the connection request from the telephone device 70, the AP 6 executes authentication based on the connection request. This authentication is the same as the authentication executed in a case where the AP 6 receives the connection request from the MFP 10. The AP 6 sends an authentication result to the MFP 10.

The control unit 80 monitors whether the authentication result is received from the AP 6. Upon receiving the authentication result indicating that authentication succeeded from the AP 6, the telephone device 70 and the AP 6 reach a state where a wireless connection has been established, and become capable of executing the wireless communication.

When a setting changing unit 56 sends the designated setting WS2 to the telephone device 70 by using the initial setting WS1, the wireless communicating unit 52 switches the MFP 10 from the adhoc mode to the infrastructure mode. Next, although not shown, the wireless communicating unit 52 executes a connection establish process with the AP 6, using the designated setting WS2, in order to execute a wireless communication with the AP 6.

Consequently, upon receiving the facsimile data via the PSTN 8, the control unit 80 sends the facsimile data to the MFP 10 via the AP 6 (i.e., by using the designated setting WS2). Further, when a facsimile sending instruction is executed by the user operating the operating unit 12, the wireless communicating unit 52 reads a document set on the scan performing unit 18, and generates facsimile data. Next, the generated facsimile data is sent to the telephone device 70 via the AP 6 (i.e., by using an infrastructural wireless communication). The control unit 80 of the telephone device 70 sends the facsimile data to a specific device (e.g., the facsimile device 4) via the PSTN 8.

In the case where the designated setting WS2 is being stored in the target setting storing area 42, i.e., in the case where the MFP 10 is in the infrastructure mode, a determining unit 54 determines whether the MFP 10 and the telephone device 70 are capable of executing an infrastructural wireless communication (i.e., a wireless communication using the designated setting WS2). Specifically, the determining unit 54 acquires an IP address of the telephone device 70 from a DNS (abbreviation of: Domain Name Server) (not shown). Next, the determining unit 54 designates the acquired IP address as the sending destination, and sends a PING (abbreviation of: Packet Internet Groper). The PING includes an IP address of the MFP 10. Moreover, in the infrastructure mode, the MFP 10 and the telephone device 70 are assigned the IP address from a DHCP (abbreviation of: Dynamic Host Configuration Protocol) server (not shown).

Upon receiving the PING, the control unit 80 of the telephone device 70 designates the IP address of the MFP 10 included in the PING as the sending destination, and sends a packet indicating OK in response to the PING. Upon receiving the packet indicating OK from the telephone device 70, the determining unit 54 determines that an infrastructural wireless communication with the telephone device 70 can be executed. On the other hand, in a case where a packet indicating OK is not received from the telephone device 70 even though a first period (e.g., 10 seconds) since the PING was sent has elapsed, the determining unit 54 determines that an infrastructural wireless communication with the telephone device 70 cannot be executed.

Moreover, in the case where the MFP 10 is in the adhoc mode, the determining unit 54 determines whether the MFP 10 and the telephone device 70 are capable of executing an adhoc wireless communication (i.e., a wireless communication using the initial setting WS1). Specifically, the determining unit 54 designates an initial IP address of the telephone device 70, this having been stored in advance in the initial setting storing area 38, as the sending destination, and sends a PING. The PING includes the IP address of the MFP 10, which has been stored in advance in the initial setting storing area 38.

Upon receiving the PING, the control unit 80 designates the IP address of the MFP 10 included in the PING as the sending destination, and sends a packet indicating OK in response to the PING. Upon receiving the packet indicating OK from the telephone device 70, the determining unit 54 determines that an adhoc wireless communication with the telephone device 70 can be executed. On the other hand, in a case where a packet indicating OK is not received from the telephone device 70 even though a first period (e.g., 10 seconds) has elapsed since the PING was sent, the determining unit 54 determines that the adhoc wireless communication with the telephone device 70 cannot be executed.

When the user designates the designated setting WS2 in the MFP 10, the MFP 10 executes a process for executing an infrastructural wireless communication with the telephone device 70. Consequently, the MFP 10 becomes capable of executing a wireless communication with the telephone device 70 via the AP 6.

(Communication State Determining Process Executed by MFP)

Next, a communication state determining process executed by the control unit 30 of the MFP 10 will be described with reference to FIG. 3. In a case where the designated setting WS (below, the designated setting WS2) is being stored in the target setting storing area 42 (i.e., the setting information which the MFP 10 is to currently use is the designated setting WS2), the control unit 30 repeatedly executes the communication state determining process.

First, in S2 the determining unit 54 sends a PING to the telephone device 70 by using the designated setting WS2. In S4 the determining unit 54 monitors whether a response to the PING (i.e., a packet indicating OK) is received from the telephone device 70. If a response from the telephone device 70 is received before the first period since sending the PING has elapsed (YES in S4), the determining unit 54 determines that a wireless communication with the telephone device 70 using the designated setting WS2 can be executed, and the process returns to S2. Usually, in the case where the MFP 10 is set to the infrastructure mode, the MFP 10 is capable of executing an infrastructural wireless communication with the telephone device 70. Consequently, YES is usually determined in S4.

If the response from the telephone device 70 is not received even though the first period since sending the PING has elapsed (NO in S4), the determining unit 54 determines that the wireless communication with the telephone device 70 by using the designated setting WS2 cannot be executed, and the process proceeds to S6.

In S6, an output controlling unit 60 displays, on the displaying unit 14, information indicating that the MFP 10 cannot execute the wireless communication with the telephone device 70 by using the designated setting WS2. The output controlling unit 60 further displays, on the displaying unit 14, operation information prompting the user to execute a predetermined OK operation on the operating unit 12 (e.g., operating an "OK button" of the operating unit 12). In S8 the control unit 30 monitors whether the user has executed the OK operation. In a case where the OK operation is executed by the user before a second period (e.g., 1 minute) has elapsed since displaying the operation information on the displaying unit 14 (YES in S8), in S10 the output controlling unit 60 displays the character string "Please Reset Telephone Device" on the displaying unit 14, and the process proceeds to S12. In a case where the predetermined operation is not executed by the user even though the second period has elapsed since displaying the operation information on the displaying unit 14 (NO in S8), S10 is skipped, and the process proceeds to S12.

In S12 the wireless communicating unit 52 broadcasts a Probe Request including the SSID "AAAYYY" included in the initial setting WS1. In a state where the initial setting WS1 is being stored in the target setting storing area 92 of the telephone device 70, when the control unit 80 receives the Probe Request including the SSID "AAAYYY", the control unit 80 sends a Probe Response including the SSID "AAAYYY" to the MFP 10 as a response to the Probe Request. On the other hand, in a state where the initial setting WS1 is not being stored in the target setting storing area 92 of the telephone device 70, the control unit 80 does not send a Probe Response even if the Probe Request including the SSID "AAAYYY" was received.

In S14 the wireless communicating unit 52 monitors whether a Probe Response including the SSID "AAAYYY" is received. In a case where a Probe Response including the SSID "AAAYYY" is received before a third period (e.g., 10 seconds) has elapsed since the sending of the Probe Request (YES in S14), the telephone device 70 is in a state of being capable of executing a wireless communication by using the initial setting WS1. Consequently, the MFP 10 is likely to be capable of executing a wireless communication with the telephone device 70 by using the initial setting WS1. In this case, in S16 the setting changing unit 56 changes the MFP 10 from the infrastructure mode to the adhoc mode by changing the setting information that the MFP 10 is to currently use from the designated setting WS2 to the initial setting WS1. Specifically, the setting changing unit 56 erases the designated setting WS2, which is being stored in the target setting storing area 42, and stores the initial setting WS1 in the target setting storing area 42. Moreover, in S16 the wireless communicating unit 52 creates a state of being able to execute a wireless communication with the telephone device 70 by executing a connection establish process with the telephone device 70 by using the initial setting WS1.

On the other hand, in a case where a Probe Response is not received even though the third period has elapsed since the sending of the Probe Request (NO in S14), it is probable that the telephone device 70 is not in a state of being capable of executing a wireless communication by using the initial setting WS1. Consequently, it is unlikely that the MFP 10 is capable of executing a wireless communication with the telephone device 70 by using the initial setting WS1. In this case, the process returns to S6. Consequently, the designated setting WS2 is maintained in the target setting storing area 42. That is, the setting information that the MFP 10 is to currently use is maintained as the designated setting WS2.

When the process S16 ends, in S18 the wireless communicating unit 52 sends a PING to the telephone device 70 by using the initial setting WS1. In S20, in a case where a response is not received from the telephone device 70 even though the first period since the sending of the PING has elapsed (NO in S20), the determining unit 54 determines that an adhoc wireless communication with the telephone device 70 cannot be executed, and the process returns to S6. On the other hand, in a case where a response from the telephone device 70 is received before the first period since the sending of the PING has elapsed (YES in S20), the determining unit 54 determines that an adhoc wireless communication with the telephone device 70 can be executed, and the process proceeds to S21. In S21 the wireless communicating unit 52 initializes a number of retries (i.e., "0") stored in the NVRAM 34. Next, in S22 the wireless communicating unit 52 broadcasts a Probe Request including a specific SSID (e.g., SSID "MMM") that is included in a designated setting (e.g., the designated setting WS2) being stored in the designated setting storing area 36.

Upon receiving the Probe Request including the specific SSID, an AP (e.g., the AP 6) of a network identified by the specific SSID (e.g., the SSID "MMM") sends a Probe Response including the specific SSID to the MFP 10 as a response to the Probe Request.

In S24 the wireless communicating unit 52 monitors whether a Probe Response including the specific SSID is received. In the case where a Probe Response including the specific SSID is received before the third period since the sending of the Probe Request has elapsed (YES in S24), in S26 the wireless communicating unit 52 sends, to the telephone device 70, the designated setting WS2 which is being stored in the designated setting storing area 36. Next, in S28 the setting changing unit 56 changes the MFP 10 from the adhoc mode to the infrastructure mode by changing the setting information that the MFP 10 is to currently use from the initial setting WS1 to the designated setting WS2 being stored in the designated setting storing area 36. Specifically, the setting changing unit 56 erases the initial setting WS1, which is being stored in the target setting storing area 42, and stores the designated setting WS2, which was being stored in the designated setting storing area 36, in the target setting storing area 42, and the process returns to S2.

On the other hand, in the case where a Probe Response is not received even if the third period has elapsed since the sending of the Probe Request (NO in S24), in S31 the wireless communicating unit 52 adds 1 to the number of retries stored in the NVRAM 34. Next, in S32 the wireless communicating unit 52 determines whether the number of retries is less than a predetermined number (e.g., 5). In a case where the number of retries is less than the predetermined number (YES in S32), the process returns to S22. On the other hand, in a case where the number of retries is equal to or more than the predetermined number (NO in S32), in S34 an erasing unit 62 erases the designated setting WS2 which is being stored in the designated setting storing area 36, and ends the communication state determining process. Moreover, the control unit 30 restarts the communication state determining process when the MFP 10 is set to the infrastructure mode.

(Communication Process Executed by Telephone Device) Next, a communication process executed by the telephone device 70 will be described with reference to FIG. 4. When the power of the telephone device 70 is turned ON, the control unit 80 of the telephone device 70 executes the communication process. In S40 the control unit 80 determines whether a PING is received from the MFP 10. In a case where the PING is received (YES in S40), in S41 the control unit 80 sends a packet indicating OK to the MFP 10 as a response to the PING, and the process proceeds to S42. In a case where the initial setting WS1 is being stored in the target setting storing area 92, the control unit 80 sends the packet indicating OK to the MFP 10 by using the initial setting WS1 (i.e., executes an adhoc wireless communication). On the other hand, in a case where a designated setting WS (e.g., the designated setting WS2) is being stored in the target setting storing area 92, the control unit 80 sends the packet indicating OK to the MFP 10 by using the designated setting WS which is being stored in the target setting storing area 92 (i.e., executes an infrastructural wireless communication).

In a case where the PING is not received (NO in S40), S41 is skipped, and the process proceeds to S42. In S42 the control unit 80 determines whether a Probe Request including an SSID stored in the target setting storing area 92 (e.g., the SSID "AAAYYY") is received. In the case where a Probe Request is received (YES in S42), in S43 the control unit 80 sends a Probe Response as a response to the Probe Request, and the process proceeds to S44. The Probe Request includes the SSID included in the setting information stored in the target setting storing area 92. In the case where a Probe Request is not received (NO in S42), S43 is skipped, and the process proceeds to S44.

In S44 the control unit 80 determines whether a connection request is received from the MFP 10. In a case where a connection request is received (YES in S44), in S45 the control unit 80 executes authentication by using the initial setting WS1 included in the connection request. Next, in S45 the control unit 80 sends an authentication result to the MFP 10, and the process proceeds to S46. In a case where a connection request is not received (NO in S44), S45 is skipped, and the process proceeds to S46.

In S46 the control unit 80 determines whether a designated setting WS (e.g., the designated setting WS2) is received from the MFP 10. In a case where the designated setting WS is received (YES in S46), in S47 the control unit 80 stores the designated setting WS in the designated setting storing area 86. Next, the control unit 80 executes a connection establish process (including sending a connection request and receiving an authentication result) with an external device (e.g., the AP 6) by using the designated setting WS.

In S48 the control unit 80 determines whether facsimile data is received from the MFP 10. In a case where facsimile data is received from the MFP 10 (YES in S48), in S49 the control unit 80 designates a facsimile number of a sending destination included in the facsimile data as the sending destination, sends the facsimile data, and the process proceeds to S50. The facsimile data is sent to an external device (e.g., the facsimile device 4) via the PSTN 8. On the other hand, in a case where facsimile data is not received from the MFP 10 (NO in S48), S49 is skipped, and the process proceeds to S50.

In S50 the control unit 80 determines whether facsimile data is received from an external device (e.g., the facsimile device 4) via the PSTN 8. In a case where facsimile data is received via the PSTN 8 (YES in S50), in S51 the control unit 80 sends the facsimile data to the MFP 10, and the process proceeds to S52. On the other hand, in a case where facsimile data is not received via the PSTN 8 (NO in S50), S51 is skipped, and the process proceeds to S52.

In S52 the control unit 80 determines whether the reset button 79 was operated by the user. In a case where the reset button 79 was operated (YES in S52), in S54 the control unit 80 sets the telephone device 70 to the adhoc mode, and the process returns to S40. Specifically, the control unit 80 erases a designated setting (e.g., the designated setting WS2) currently being stored in the target setting storing area 92, and stores the initial setting WS1 in the target setting storing area 92. In a case where the reset button 79 has not been operated (NO in S52), S54 is skipped, and the process returns to S40.

(First Case: Case that Telephone Device is Reset)

Next, processes executed by the apparatuses 10, 6, 70, etc. in first to fifth cases will be described. As shown in FIG. 5, in the first case, the MFP 10 and the telephone device 70 are set to the infrastructure mode. In the first case, the MFP 10 and the telephone device 70 are capable of executing a wireless communication via the AP 6 by using the designated setting WS2. In this case, in the case where the MFP 10 designates the IP address of the telephone device 70 as the sending destination and sends a PING (S2 of FIG. 3), the PING is sent to the telephone device 70 via the AP 6. Upon receiving the PING (YES in S40 of FIG. 4), the telephone device 70 sends a packet indicating OK (S41 of FIG. 4).

Figure 3:
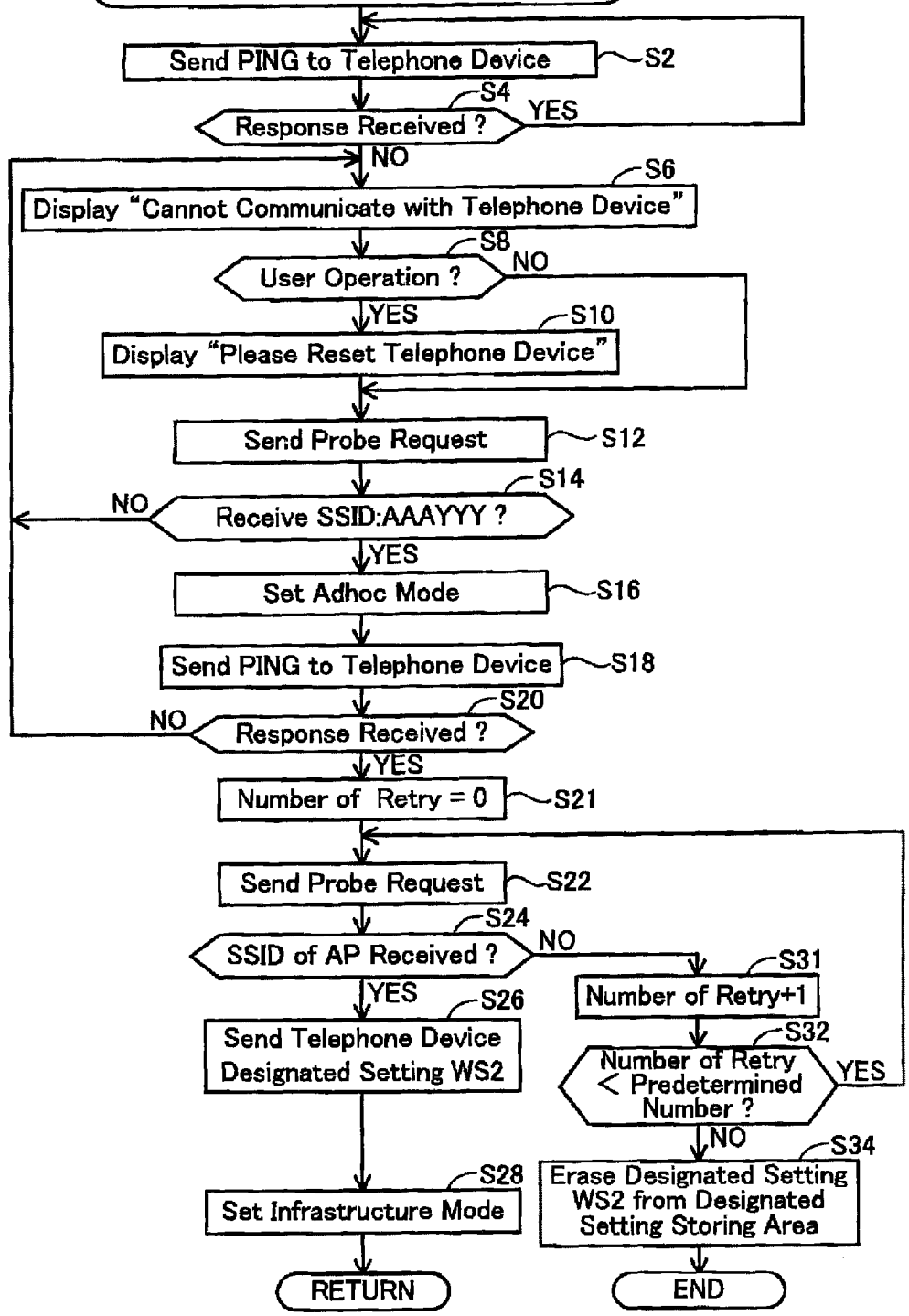
FIG. 3 shows a flowchart of a communication state determining process executed by the MFP.

For example, in the case of a poor connection between the MFP 10 and the AP 6 or a poor connection between the telephone device 70 and the AP 6, the MFP 10 cannot receive a response to the PING (NO in S4 of FIG. 3). The MFP 10 determines that a wireless communication with the telephone device 70 by using the designated setting WS2 cannot be executed (NO in S4 of FIG. 3). In this case, the user executing a predetermined operation on the MFP 10 (YES in S8 of FIG. 3) causes the MFP 10 to display the character string "Please Reset Telephone Device" on the displaying unit 14 (S10 of FIG. 3).

Figure 4:
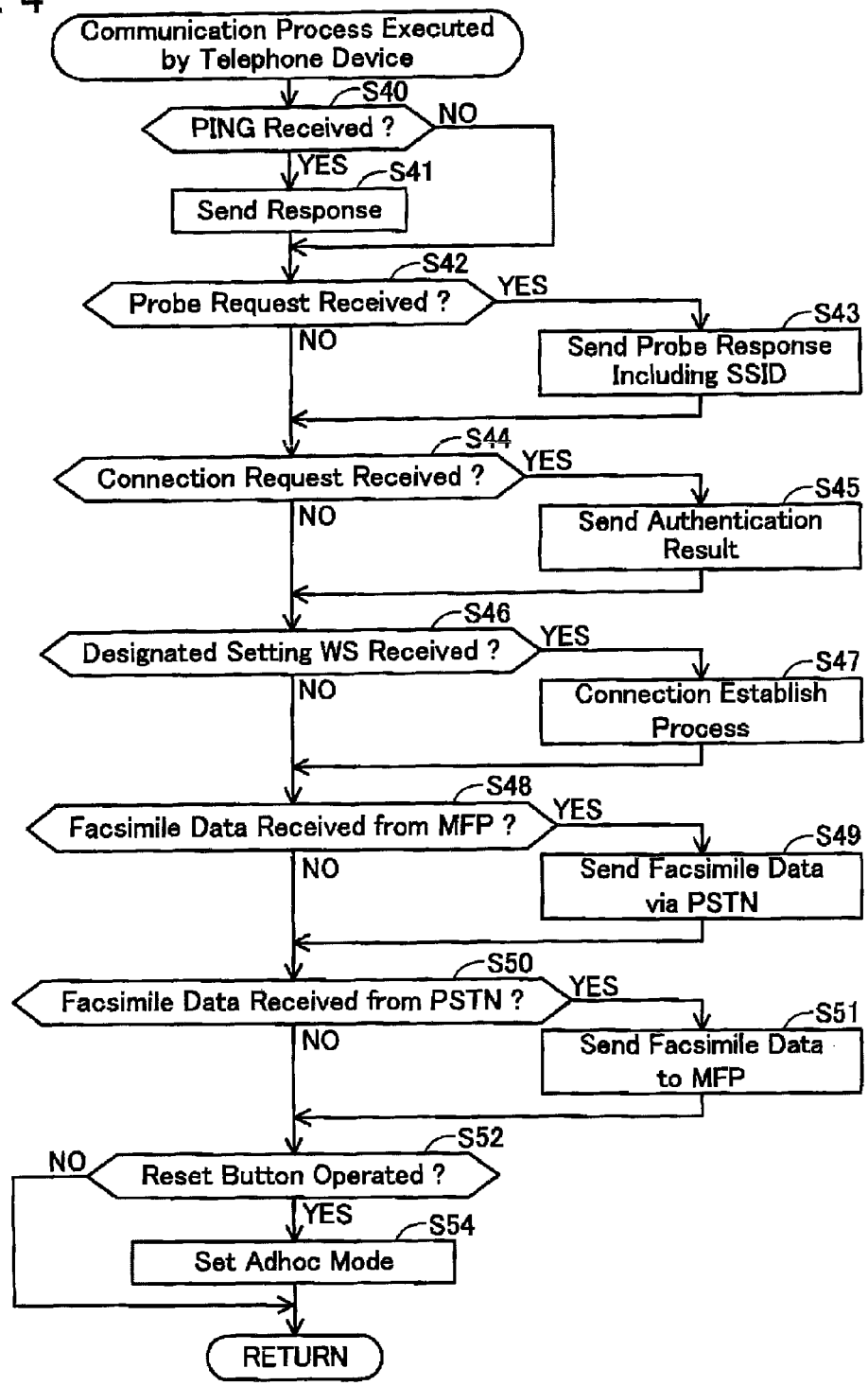
FIG. 4 shows a flowchart of a communication process executed by the telephone device.
Figure 5:
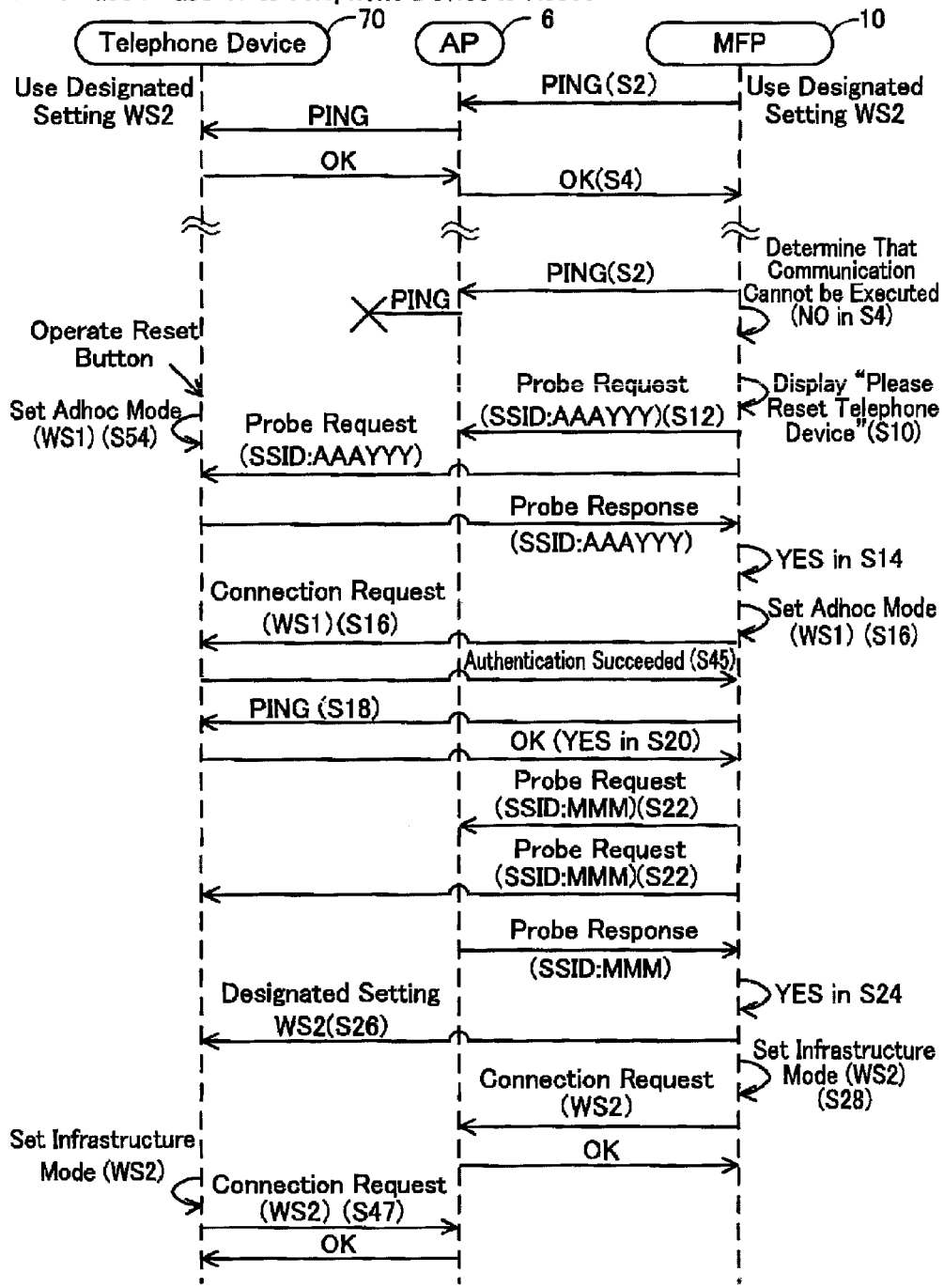
FIG. 5 shows a sequence view for explaining a first case in which the telephone device is reset.
Figure 6:
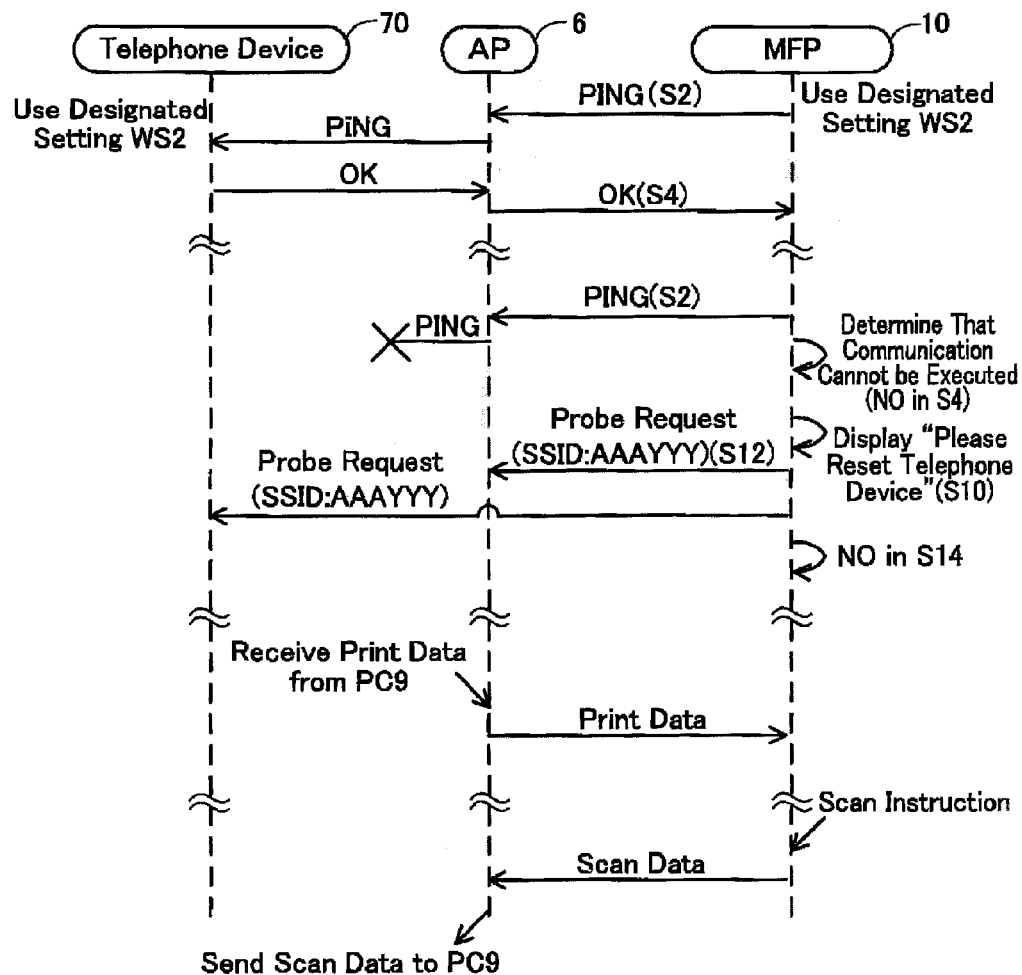
FIG. 6 shows a sequence view for explaining a second case in which the telephone device is not reset.
Figure 7:
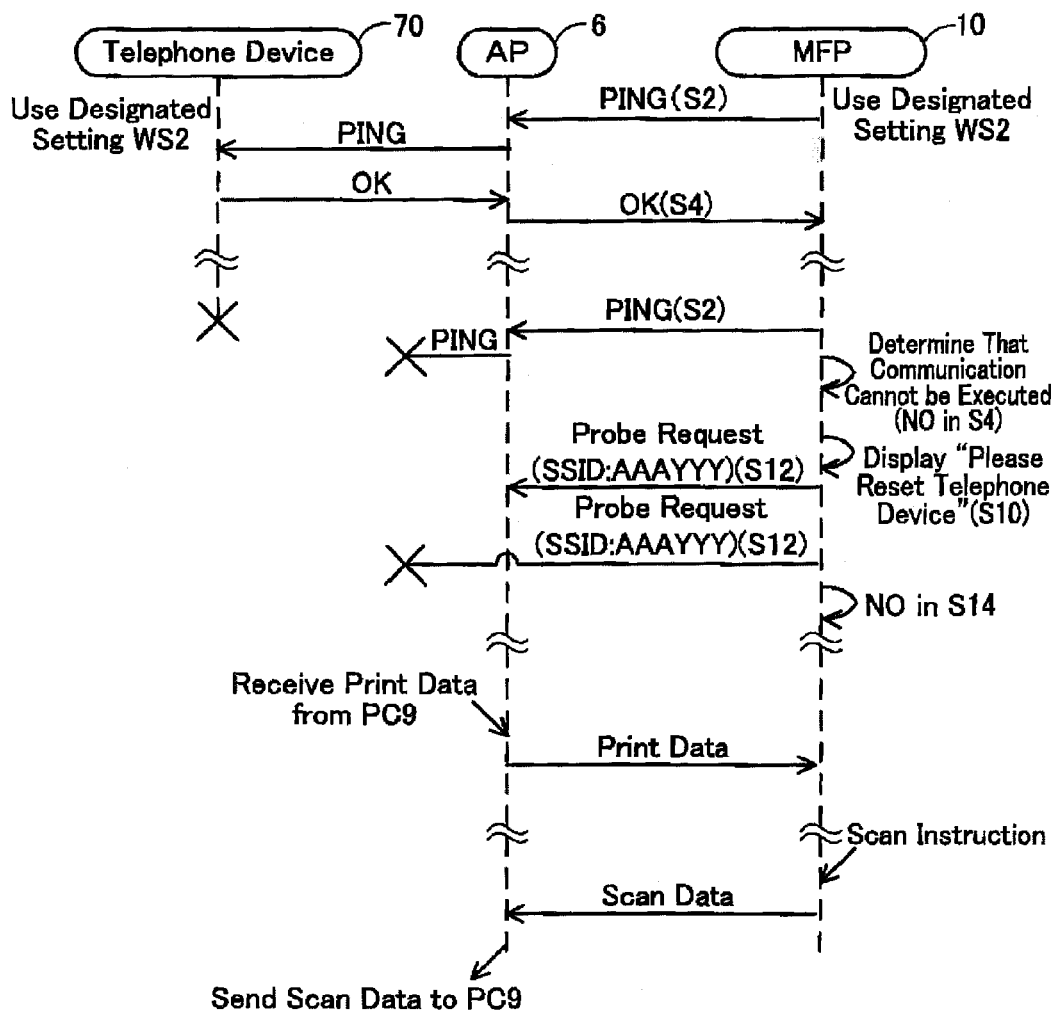
FIG. 7 shows a sequence view for explaining a third case in which the telephone device assumes a wireless communication impossible state.
Figure 8:
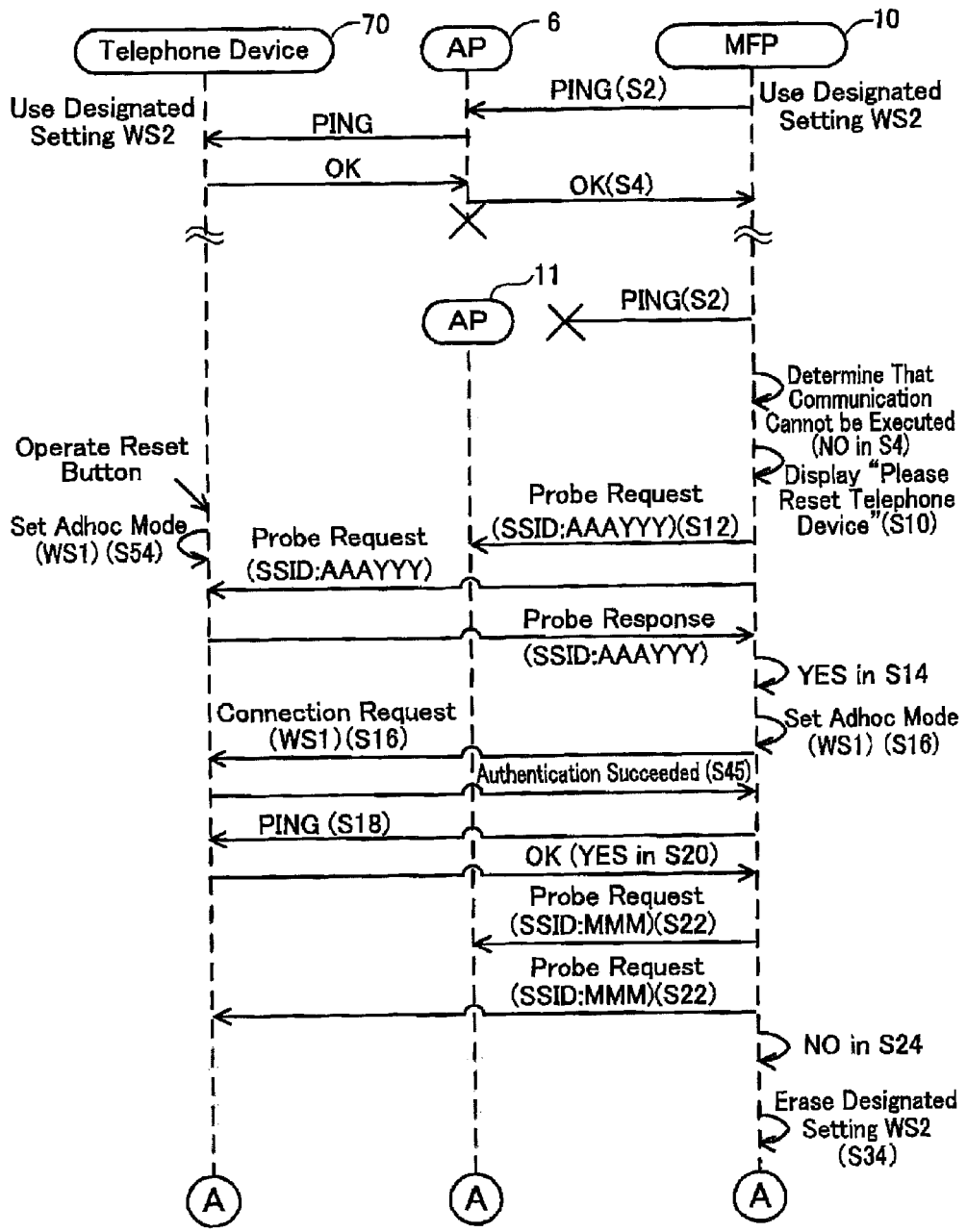
FIG. 8 shows a sequence view for explaining a fourth case in which an AP is changed.
Figure 9:
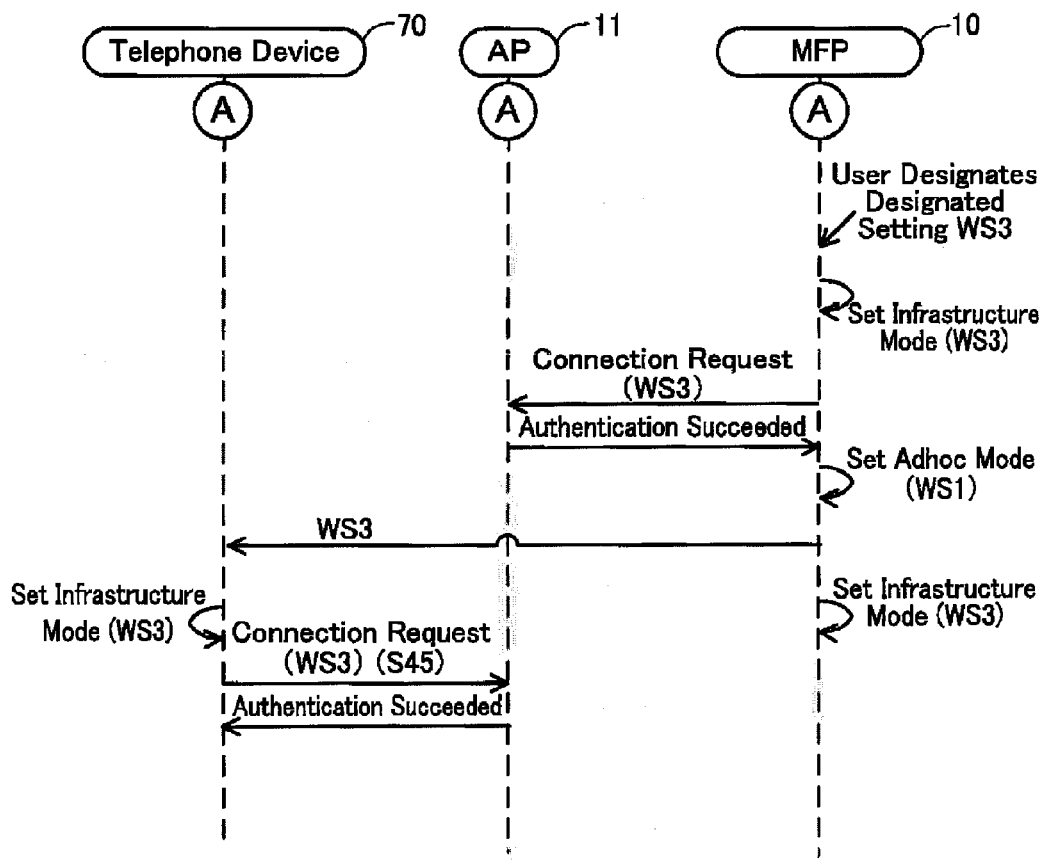
FIG. 9 shows a sequence view of a continuation of FIG. 8.

When the user operates the reset button 79 of the telephone device 70, the initial setting WS1 is stored in the target setting storing area 92 of the telephone device 70 (S54 of FIG. 4). Thereby, the telephone device 70 is set to the adhoc mode.

The MFP 10 broadcasts a Probe Request including the SSID "AAAYYY" included in the initial setting WS1 (S12 of FIG. 3). Upon receiving the Probe Request including the SSID "AAAYYY" (YES in S32 of FIG. 4), the telephone device 70 determines that the received SSID is the same as the SSID "AAAYYY" of the initial setting WS1 stored in the target setting storing area 92. The telephone device 70 sends a Probe Response including the SSID "AAAYYY" to the MFP 10 as a response to the Probe Request (S43 of FIG. 4).

The MFP 10 receives the Probe Response including the SSID "AAAYYY" (YES in S14 of FIG. 3). In this case, the telephone device 70 is capable of executing a wireless communication by using the initial setting WS1. Consequently, it is probable that the MFP 10 is capable of executing a wireless communication with the telephone device 70 by using the initial setting WS1. Consequently, the MFP 10 changes the setting information that is to be currently used from the designated setting WS2 to the initial setting WS1 (S16 of FIG. 3). Next, the MFP 10 executes a connection establish process with the telephone device 70 by using the initial setting WS1.

Upon receiving an authentication result indicating that authentication succeeded from the telephone device 70, the MFP 10 sends a PING by using the initial setting WS1 (S18 of FIG. 3). Upon receiving the PING (S40 of FIG. 4), the telephone device 70 sends a packet indicating OK to the MFP 10 (S41 of FIG. 4). Next, the MFP 10 broadcasts a Probe Request including the SSID "MMM" of the AP 6 included in the designated setting WS2 which is being stored in the designated setting storing area 36 (S22 of FIG. 3).

Upon receiving the Probe Request including the SSID "MMM", the AP 6 sends a Probe Response including the SSID "MMM" to the MFP 10 as a response to the Probe Request. Upon receiving The Probe Response including the SSID "MMM" (YES in S24 of FIG. 3), the MFP 10 determines that it can execute an infrastructural wireless communication with the telephone device 70 via the AP 6. Thereupon, using the initial setting WS1, the MFP 10 sends the designated setting WS2 to the telephone device 70 (S26 of FIG. 3). Then the MFP 10 sets the MFP 10 to the infrastructure mode (S28 of FIG. 3).

Upon receiving the designated setting WS2, the telephone device 70 stores the designated setting WS2 in the designated setting storing area 86. Next, the telephone device 70 sets the telephone device 70 to the infrastructure mode.

The MFP 10 and the telephone device 70 each execute the connection establish process with the AP 6, using the designated setting WS2, in order to execute a wireless communication with the AP 6. As described above, in the case where the telephone device 70 and the MFP 10 have become unable to execute an infrastructural wireless communication, when the reset button 79 of the telephone device 70 is operated (S52 of FIG. 4), the initial setting WS1 is stored in the target setting storing area 92 of the telephone device 70 (S54 of FIG. 4). Thereby, the MFP 10 becomes capable of receiving the Probe Response including the SSID "AAAYYY". In the case of receiving the Probe Response including the SSID "AAAYYY" (YES in S14 of FIG. 3), the MFP 10 changes the setting information that is currently to be used from the designated setting WS2 to the initial setting WS1 (S16 of FIG. 3). Consequently, both the MFP 10 and the telephone device 70 can set the setting information that is currently to be used to the initial setting WS1. According to this configuration, by using the initial setting WS1, the MFP 10 can appropriately send the designated setting WS2 to the telephone device 70. Thereby, the MFP 10 and the telephone device 70 can execute a wireless communication by using the designated setting WS2. That is, in the case where the telephone device 70 and the MFP 10 have become unable to execute an infrastructural wireless communication, the telephone device 70 and the MFP 10 regain the ability to execute an infrastructural wireless communication.

(Second Case: Case that Telephone Device is Not Reset)

The second case is the same as the first case until the MFP 10 executes the process S10 of FIG. 3. However, the user does not operate the reset button 79 of the telephone device 70. That is, it is a state where the designated setting WS2 is being stored in the target setting storing area 92 of the telephone device 70. In this situation, even if the MFP 10 broadcasts a Probe Request including the SSID "AAAYYY" included in the initial setting WS1 (S12 of FIG. 3), the telephone device 70 cannot send a Probe Response including the SSID "AAAYYY" to the MFP 10 (NO in S42 of FIG. 3). In this situation, the MFP 10 cannot execute a wireless communication with the telephone device 70 by using the initial setting WS1 even if the setting information that is to currently be used was changed from the designated setting WS2 to the initial setting WS1. That is, the MFP 10 cannot send a designated setting (e.g., WS2) to the telephone device 70 even if executing a wireless communication using the initial setting WS1. In this case, the MFP 10 maintains the state of the designated setting WS2 being stored in the target setting storing area 92. That is, the MFP 10 is maintained in the infrastructure mode.

In the second case, since the MFP 10 is maintained in the infrastructure mode, the MFP 10 can maintain the state of being able to execute a wireless communication via the AP 6. For example, the MFP 10 can receive print data from the PC 9 via the AP 6. Further, the MFP 10 can send scan data generated by the scan performing unit 18 to the PC 9 via the AP 6.

(Third Case: Case that Telephone Device assumes Wireless Communication Impossible State)

The third case is a case in which the MFP 10 and the telephone device 70 become unable to execute a wireless communication, in the case of, e.g., the telephone device 70 being switched from power ON to power OFF, or the telephone device 70 malfunctioning.

The third case is the same as the first case until the MFP 10 executes the process S10 of FIG. 3. However, in the third case, the telephone device 70 is not in a state of being able to execute a wireless communication. Consequently, even if the MFP 10 broadcasts a Probe Request including the SSID "AAAYYY" included in the initial setting WS1 (S12 of FIG. 3), the MFP 10 cannot receive a Probe Response including the SSID "AAAYYY" from the telephone device 70. In this case, the MFP 10 maintains the state of the designated setting WS2 being stored in the target setting storing area 42. That is, the MFP 10 is maintained in the infrastructure mode.

In the third case, similar to the second case, since the MFP 10 is maintained in the infrastructure mode, the MFP 10 can maintain the wireless communication via the AP 6. For example, the MFP 10 can receive print data from the PC 9 via the AP 6. Further, the MFP 10 can send scan data generated by the scan performing unit 18 to the PC 9 via the AP 6.

(Fourth Case: Case that AP is Changed)

The fourth case is a case in which the MFP 10 becomes unable to execute a wireless communication with the telephone device 70 by using the designated setting WS2 due to the AP 6 having been changed to an AP 11.

In the fourth case, similar to the first to third cases, the MFP 10 receives a response to a PING from the telephone device 70 (YES in S4 of FIG. 3, S41 of FIG. 4). However, when the AP 6 becomes obsolete, and the AP 11 is newly established, the MFP 10 becomes unable to send a PING to the telephone device 70 by using the designated setting WS2.

In this case, the MFP 10 displays the character string "Please Reset Telephone Device" on the displaying unit 14 (S10 of FIG. 3). When the user operates the reset button 79 of the telephone device 70, the initial setting WS1 is stored in the target setting storing area 92 of the telephone device 70 (S54 of FIG. 4). Thereby, the telephone device 70 is set to the adhoc mode. Consequently, similar to the first case, the MFP 10 receives a Probe Response including the SSID "AAAYYY" from the telephone device 70 as a response to a Probe Request including the SSID "AAAYYY" (YES in S14 of FIG. 3).

Similar to the first case, when the MFP 10 is changed from the infrastructure mode to the adhoc mode (S16 of FIG. 3), the MFP 10 and the telephone device 70 can execute an adhoc wireless communication by using the initial setting WS1 which is being stored in the target setting storing area 42. Next, the MFP 10 sends a PING by using the initial setting WS1 (S18 of FIG. 3). Upon receiving the PING (S40 of FIG. 4), the telephone device 70 sends a packet indicating OK to the MFP 10 (S41 of FIG. 4).

The MFP 10 broadcasts a Probe Request including the SSID "MMM" of the AP 6 included in the designated setting WS2 (S22 of FIG. 3). Since the AP 6 is already obsolete, the MFP 10 cannot receive a Probe Response (NO in S24 of FIG. 3). Since the MFP 10 cannot receive a Probe Response even when sending a Probe Request including the SSID "MMM" for a predetermined number of times (NO in S32 of FIG. 3), the MFP 10 erases the designated setting WS2 which is being stored in the designated setting storing area 36 (S34 of FIG. 3). According to this configuration, the designated setting WS2, which can no longer be used for executing a wireless communication, can appropriately be erased. Consequently, unnecessary information can be prevented from remaining stored in the NVRAM 34.

By operating the operating unit 12, the user can designate the designated setting WS3 of the AP 11 to the MFP 10. The MFP 10 stores the designated setting WS3, which was designated by the user, in the designated setting storing area 36 and in the target setting storing area 42. Next, the MFP 10 executes a connection establish process with the AP 11 by using the designated setting WS3.

The MFP 10 erases the designated setting WS3 that is being stored in the target setting storing area 42, and stores the initial setting WS1 in the target setting storing area 42. Consequently, the MFP 10 is changed from the infrastructure mode to the adhoc mode. Next, by using the initial setting WS1, the MFP 10 sends the designated setting WS3, which is being stored in the designated setting storing area 36, to the telephone device 70. The MFP 10 erases the initial setting WS1 that is being stored in the target setting storing area 42, and stores the designated setting WS3 in the target setting storing area 42. Consequently, the MFP 10 is changed from the adhoc mode to the infrastructure mode.

Upon receiving the designated setting WS3 from the MFP 10, the telephone device 70 erases the designated setting WS2 that is being stored in the designated setting storing area 86, and stores the designated setting WS3 in the designated setting storing area 86. Next, the telephone device 70 stores, in the target setting storing area 92, the designated setting WS3 that is being stored in the designated setting storing area 86. Thereby, the telephone device 70 is changed from the adhoc mode to the infrastructure mode.

The telephone device 70 executes, by using the designated setting WS3, a connection establish process with the AP 11 in order to execute a wireless communication with the AP 11. Although not shown, the MFP 10 also executes, by using the designated setting WS3, a connection establish process with the AP 11 in order to execute a wireless communication with the AP 11. Thereby, in the case where the AP 6 becomes obsolete and the AP 11 is newly established, the telephone device 70 and the MFP 10 become capable of executing an infrastructural wireless communication by designating the designated setting WS3 in the MFP 10.

Further, in the case where a Probe Response including the SSID "MMM" in response to the Probe Request including the SSID "MMM" of the AP 6 is not received (NO in S24 of FIG. 3), the MFP 10 executes a wireless communication by using the initial setting WS1 which is being stored in the target setting storing area 42. In the case where a Probe Response including the SSID "MMM" is not received, it is unlikely that the MFP 10 can execute a wireless communication with the telephone device 70 by using the designated setting WS2. In this case, the MFP 10 does not send the designated setting WS2 to the telephone device 70. Further, the MFP 10 maintains the state of the initial setting WS1 being stored in the target setting storing area 42. Consequently, the MFP 10 can execute a wireless communication with the telephone device 70 by using the initial setting WS1.

Effect of Present Embodiment

In the first case above, in the case where the MFP 10 is not capable of executing a wireless communication with the telephone device 70 by using the designated setting WS2, i.e., cannot receive a response to the PING, the MFP 10 broadcasts a Probe Request including the SSID "AAAYYY" included in the initial setting WS1. In the case where the initial setting WS1 is being stored in the target setting storing area 92, the telephone device 70 sends a Probe Response including the SSID "AAAYYY" in response to the Probe Request including the SSID "AAAYYY". In this situation, the MFP 10 can execute an adhoc wireless communication with the telephone device 70 by using the initial setting WS1. Consequently, in the case of receiving the Probe Response including the SSID "AAAYYY", the MFP 10 changes the designated setting WS2 being stored in the target setting storing area 42 to the initial setting WS1. Thereby, the MFP 10 can execute an adhoc wireless communication with the telephone device 70 by using the initial setting WS1.

On the other hand, in the second case and third case above, even if broadcasting the Probe Request including the SSID "AAAYYY" included in the initial setting WS1, the MFP 10 cannot receive a Probe Response including the SSID "AAAYYY" from the telephone device 70. In this case, the MFP 10 cannot execute an adhoc wireless communication with the telephone device 70 by using the initial setting WS1. Consequently, the MFP 10 does not erase, but maintains the designated setting WS2 stored in the target setting storing area 42. Thereby, the MFP 10 can maintain the state of being capable of executing a wireless communication with the PC 9 connected to the AP 6. According to this configuration, in the case where wireless communication with the telephone device 70 cannot be executed by using the designated setting WS2, a wireless communication can be executed using appropriate setting information.

(Corresponding Relationships)

The MFP 10 is an example of the "wireless communication device", and the telephone device 70 is an example of the "specific device". The initial setting WS1 is an example of the "first setting information", and the designated setting WS2 is an example of the "second setting information". The NVRAM 34 is an example of the "information memory". The SSID "AAAYYY" included in the initial setting WS1 is an example of the "first network identifier", and the SSID "MMM" included in the designated setting WS2 is an example of the "second network identifier". The setting information being stored in the target setting storing area 42 is an example of the "target setting information". The case of executing the process S16 of FIG. 3 is an example of the "specific case", the case of YES in S24 of FIG. 3 is an example of the "first case", and the case of NO in S24 of FIG. 3 is an example of the "second case". The displaying unit 14 is an example of the "output module". The production number (i.e., AAABBB) of the MFP 10 is an example of the "first identifying information", and the production number (i.e., YYYZZZ) of the telephone device 70 is an example of the "second identifying information".

(1) In the above embodiment, in S4 of FIG. 3 the determining unit 54 determines that a wireless communication with the telephone device 70 can be executed in the case where a PING is sent to the telephone device 70 and a response to the PING is received, and determines that a wireless communication with the telephone device 70 cannot be executed in the case where a response to the PING is not received. However, the determining unit 54 may determine that a wireless communication with the telephone device 70 can be executed in the case where facsimile data can be sent to the telephone device 70 by using the designated setting WS2, and may determine that a wireless communication with the telephone device 70 cannot be executed in the case where facsimile data cannot be sent to the telephone device 70. The present variant is included in the configuration where the determining unit 54 "determines whether the wireless communication device is capable of executing the wireless communication using the second setting information with the specific device in a case where target setting information that is setting information currently to be used by the wireless communication device is the second setting information".

(2) In the above embodiment, in S10 of FIG. 3 the output controlling unit 60 displays the character string "Please Reset Telephone Device" on the displaying unit 14. However, the output controlling unit 60 may cause the print performing unit 16 to print an image representing the character string "Please Reset Telephone Device". In the present variant, the print performing unit 16 is an example of the "output module". Alternatively, the output controlling unit 60 may cause the wireless communicating unit 52 to send data representing "Please Reset Telephone Device" to the PC 9 by using the designated setting WS2. The PC 9 may display the character string "Please Reset Telephone Device" on a displaying unit of the PC 9. In the present variant, the displaying unit of the PC 9 is an example of the "output module". That is, the "wireless communication device" may comprise the "output module", or a device different from the "wireless communication device" may comprise the "output module".

(3) In the above embodiment, the SSID "AAAYYY" included in the initial setting WS1 is generated using "AAA", which is a part of the production number (i.e., AAABBB) of the MFP 10, and "YYY", which is a part of the production number (i.e., YYYZZZ) of the telephone device 70. However, the SSID included in the initial setting WS1 may be generated using the MAC address of the MFP 10, and the MAC address of the telephone device 70. In the present variant, the MAC address of the MFP 10 is an example of the "first identifying information", and the MAC address of the telephone device 70 is an example of the "second identifying information".

(4) In the above embodiment, in S12 of FIG. 3 the MFP 10 broadcasts a Probe Request including the SSID "AAAYYY", and in S14 of FIG. 3 determines whether a Probe Response including the SSID "AAAYYY" is received. However, in S12 of FIG. 3 the MFP 10 may broadcast a Probe Request that does not include the SSID of a target that is to be received. In this case, an external device (e.g., the telephone device 70) that received the Probe Request sent from the MFP 10 may send, to the MFP 10, a Probe Response including an SSID included in setting information that is to currently be used by the external device, as a response to the Probe Request. In S14 of FIG. 3 the MFP 10 may determine whether a Probe Response including the SSID "AAAYYY" is received. Alternatively, the MFP 10 may not execute the process S12 of FIG. 3, i.e., the process of sending a Probe Request. In this case, the MFP 10 may monitor whether a beacon signal is received from an external device (e.g., the telephone device 70). In the case where a beacon signal is received, the MFP 10 may determine whether the SSID "AAAYYY" is included in the received beacon signal. In the case where the SSID "AAAYYY" is included in the received beacon signal, the process may move to S16 of FIG. 3, and in the case where the SSID "AAAYYY" is not included, the process may move to S6 of FIG. 3. In general terms, in the case where it is determined that a wireless communication with the telephone device 70 by using the designated setting WS2 cannot be executed (NO in S4 of FIG. 3), the MFP 10 may determine whether the SSID "AAAYYY" included in the initial setting WS1 is received from the telephone device 70.

(5) Further, in the above embodiment, the units 52 to 62 are realized by the CPU 32 executing programs. Instead, at least one of the units 52 to 62 may be realized by hardware such as a logic circuit, etc.

The invention claimed is:

1. A wireless communication device for executing a wireless communication with a specific device, the wireless communication device comprising:
   an information memory that stores first setting information including a first network identifier;
   one or more processors; and
   an instruction memory that stores computer-readable instructions therein, the computer-readable instructions, when executed by the one or more processors, causing the wireless communication device to execute:
   executing a wireless communication with the specific device by using the first setting information or second setting information that is different from the first setting information;
   determining whether or not the wireless communication device is capable of executing the wireless communication using the second setting information with the specific device, in a case where target setting information that is setting information currently to be used by the wireless communication device is the second setting information;
   changing the target setting information from the second setting information to the first setting information in a case where the first network identifier is received from the specific device in a situation in which it is determined that the wireless communication device is not capable of executing the wireless communication using the second setting information with the specific device; and
   maintaining the second setting information as the target setting information in a case where the first network identifier is not received from the specific device in the situation in which it is determined that the wireless communication device is not capable of executing the wireless communication using the second setting information with the specific device.

2. The wireless communication device according to claim 1, wherein
the information memory further stores the second setting information, and
in a specific case where the target setting information is changed from the second setting information to the first setting information,
the computer-readable instructions, when executed by the one or more processors, cause the wireless communication device to further execute:
sending the second setting information to the specific device by using the first setting information that is the target setting information, and
changing the target setting information from the first setting information to the second setting information after the second setting information has been sent to the specific device.

3. The wireless communication device according to claim 2, wherein
the computer-readable instructions cause the wireless communication device to execute the sending of the second setting information to the specific device in a first case where the second network identifier included in the second setting information and different from the first network identifier is received in the specific case, and
the computer-readable instructions cause the wireless communication device not to execute the sending of the second setting information to the specific device in a second case where the second network identifier is not received in the specific case, and
the computer-readable instructions cause the wireless communication device to execute:
the changing of the target setting information from the first setting information to the second setting information in the first case; and
maintaining the first setting information as the target setting information in the second case.

4. The wireless communication device according to claim 3, wherein
the computer-readable instructions, when executed by the one or more processors, cause the wireless communication device to further execute:
erasing the second setting information from the information memory in the second case.

5. The wireless communication device according to claim 1, wherein
the computer-readable instructions, when executed by the one or more processors, cause the wireless communication device to further execute:
causing an output module to output information for causing the specific device to execute a wireless communication using the first setting information in the case where it is determined that the wireless communication with the specific device cannot be executed by using the second setting information.

6. The wireless communication device according to claim 1, wherein the first network identifier is a network identifier unique to a first network that is obtained by using a first identifying information unique to the wireless communication device and a second identifying information unique to the specific device, and the first network is a network for the wireless communication device to execute the wireless communication with the specific device by using the first setting information.

7. The wireless communication device according to claim 1, wherein
the first setting information includes ad hoc wireless setting information, and
the second setting information includes infrastructural wireless setting information.

8. A wireless communication device for executing a wireless communication with a specific device, the wireless communication device comprising:
an information memory that stores first setting information including a first network identifier;
a wireless communicating unit configured to execute a wireless communication with the specific device by using the first setting information or second setting information that is different from the first setting information;
a determining unit configured to determine whether or not the wireless communication device is capable of executing the wireless communication using the second setting information with the specific device, in a case where target setting information that is setting information currently to be used by the wireless communication device is the second setting information; and
a changing unit configured to change the target setting information from the second setting information to the first setting information in a case where the first network identifier is received from the specific device in a situation in which it is determined that the wireless communication device is not capable of executing the wireless communication using the second setting information with the specific device, and maintain the second setting information as the target setting information in a case where the first network identifier is not received from the specific device in the situation in which it is determined that the wireless communication device is not capable of executing the wireless communication using the second setting information with the specific device.

9. A non-transitory computer-readable storage medium storing computer-readable instructions for a wireless communication device for executing a wireless communication with a specific device, and comprising an information memory that stores first setting information including a first network identifier, the computer-readable instructions, when executed by one or more processors mounted on the wireless communication device, causing the wireless communication device to execute:
executing a wireless communication with the specific device by using the first setting information or second setting information that is different from the first setting information;
determining whether or not the wireless communication device is capable of executing the wireless communication using the second setting information with the specific device, in a case where target setting information that is setting information currently to be used by the wireless communication device is the second setting information;
changing the target setting information from the second setting information to the first setting information in a case where the first network identifier is received from the specific device in a situation in which it is determined that the wireless communication device is not capable of executing the wireless communication using the second setting information with the specific device; and
maintaining the second setting information as the target setting information in a case where the first network identifier is not received from the specific device in the situation in which it is determined that the wireless communication device is not capable of executing the wireless communication using the second setting information with the specific device.

* * * * *